(12) United States Patent
Smith et al.

(10) Patent No.: US 12,732,426 B2
(45) **Date of Patent: *Sep. 8, 2026**

(54) AUTOMATIC CONFIGURATION OF WIRELESS CONNECTIONS BETWEEN ROUTERS AND WIRELESS DEVICES

(71) Applicant: FRONTIER COMMUNICATIONS HOLDINGS, LLC, Dallas, TX (US)

(72) Inventors: Steven Smith, Keller, TX (US); Bryan Pauling, Rochester, NY (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/436,530

(22) Filed: Dec. 30, 2025

(65) Prior Publication Data

US 2026/0238545 A1 Aug. 13, 2026

Related U.S. Application Data

(63) Continuation of application No. 19/049,965, filed on Feb. 10, 2025, now Pat. No. 12,537,740.

(51) Int. Cl.

*H04L 41/0816* (2022.01)
*H04L 41/085* (2022.01)
*H04W 4/50* (2018.01)
*H04W 76/11* (2018.01)

(52) U.S. Cl.

CPC ........ *H04L 41/0816* (2013.01); *H04L 41/085* (2013.01); *H04W 4/50* (2018.02); *H04W 76/11* (2018.02)

(58) Field of Classification Search

CPC .... H04L 41/0816; H04L 41/085; H04W 4/50; H04W 76/11
USPC .......................................................... 370/254
See application file for complete search history.

(56) References Cited

U.S. PATENT DOCUMENTS

2014/0164752 A1* 6/2014 Venkiteswaran ..... G06F 9/4416 713/2
2014/0173195 A1* 6/2014 Rosset .................. G06F 9/4405 711/114
2016/0134469 A1* 5/2016 Carter .................. H04W 76/14 370/254

* cited by examiner

*Primary Examiner* — Hermon Asres

(57) ABSTRACT

The techniques described herein are directed to automatically configuring a wireless device (e.g., an extender or other type of CPE) to connect with and communicate with a wireless router without utilizing any in-line user pairing or input. The techniques include detecting the presence of a wireless device, determining that the wireless device is expected based on stored information (which may have been provisioned into the router), and configuring, based on the determination and the stored information, the router and/or the wireless device to communicate with each other. The router and/or the wireless device may validate the wireless device based on the stored information. A wireless device which has an established connection with the router may utilize the techniques described herein so that a chain of interconnected wireless devices may be automatically detected and auto-configured to provide wireless connectivity and service data delivery throughout a service location.

20 Claims, 2 Drawing Sheets

AUTOMATIC CONFIGURATION OF WIRELESS CONNECTIONS BETWEEN ROUTERS AND WIRELESS DEVICES

CROSS-REFERENCE TO RELATED APPLICATIONS

This application is a continuation of U.S. patent application Ser. No. 19/049,965, entitled "AUTOMATIC CONFIGURATION OF WIRELESS CONNECTIONS BETWEEN ROUTERS AND WIRELESS DEVICES" and filed Feb. 10, 2025, the entire disclosure of which is hereby expressly incorporated by reference herein.

FIELD OF THE DISCLOSURE

This disclosure relates generally to wireless connections between routers and wireless devices, and in particular to automatically establishing such wireless connections without manual pairing or intervention.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In the realm of wireless networking, e.g., such as in Wi-Fi and/other short-range wireless networks implemented at end-user premises, the integration of extenders into existing wireless networks has traditionally required manual setup processes and procedures, e.g., at the router, at the extender, via a website or mobile application, etc. Sometimes these processes require a user to physically locate and access the router and the appropriate buttons or user inputs on the router to perform the setup. Often these processes necessitate in-line user interaction through applications or web interfaces to pair network extenders and other types of wireless devices with routers. The manual pairing process might involve entering website addresses, codes, username/passwords, and/other pairing information, which can be prone to error, and can be cumbersome and time-consuming, potentially leading to incorrect setups that degrade network performance, compromise security, and/or needlessly prolong the integration process. Additionally, this manual pairing process does not readily accommodate environments where network devices frequently change or where new devices are regularly introduced. Further, the need for manual configuration can be particularly challenging in complex network environments or in situations where users are not technically savvy.

Given these challenges, there are significant opportunities for platforms and technologies that streamline the integration of network extenders and other wireless devices into networks. By reducing the reliance on manual configuration, such technologies could enhance user experience, improve network security, and facilitate the deployment of more flexible and adaptable networking environments.

SUMMARY

In an embodiment, a method at a router includes detecting, by the router, a presence of a wireless device and, exclusive of any in-line user input corresponding to the detecting, determining, by the router, that the detected wireless device is included in the set of expected wireless devices corresponding to the router. The determination is based on information that is indicative of a set of expected wireless devices corresponding to the router and is or has been obtained by the router from one or more back-end servers. The method also includes, and still exclusive of any in-line user input corresponding to the detecting of the presence of the wireless device, configuring the router to communicate with the detected wireless device based on the determination, and establishing, by the router and based on the configuring, a wireless connection with the wireless device. Additionally, the method includes transmitting, by the router to the wireless device and via the wireless connection, service content data to be consumed at the wireless device.

In an embodiment, a router is configured to: detect, via a wireless interface of the router, a presence of a wireless device and, exclusive of any in-line user input corresponding to the detection of the presence of the wireless device: (1) determine, based on information that is indicative of a set of expected wireless devices corresponding to the router and is or has been obtained at the router from one or more back-end servers, that the detected wireless device is included in the set of expected wireless devices corresponding to the router; (2) configure, based on the determination, the router to communicate with the detected wireless device; and (3) establish, based on the configuration, a wireless connection with the wireless device.

Advantages will become more apparent to those of ordinary skill in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate examples of concepts that include the claimed invention, and explain various principles and advantages of those examples.

The figures described below depict various aspects of the system and methods disclosed herein. It should be understood that each figure depicts an embodiment of a particular aspect of the disclosed system and methods, and that each of the figures is intended to accord with a possible embodiment thereof.

Figure 1:
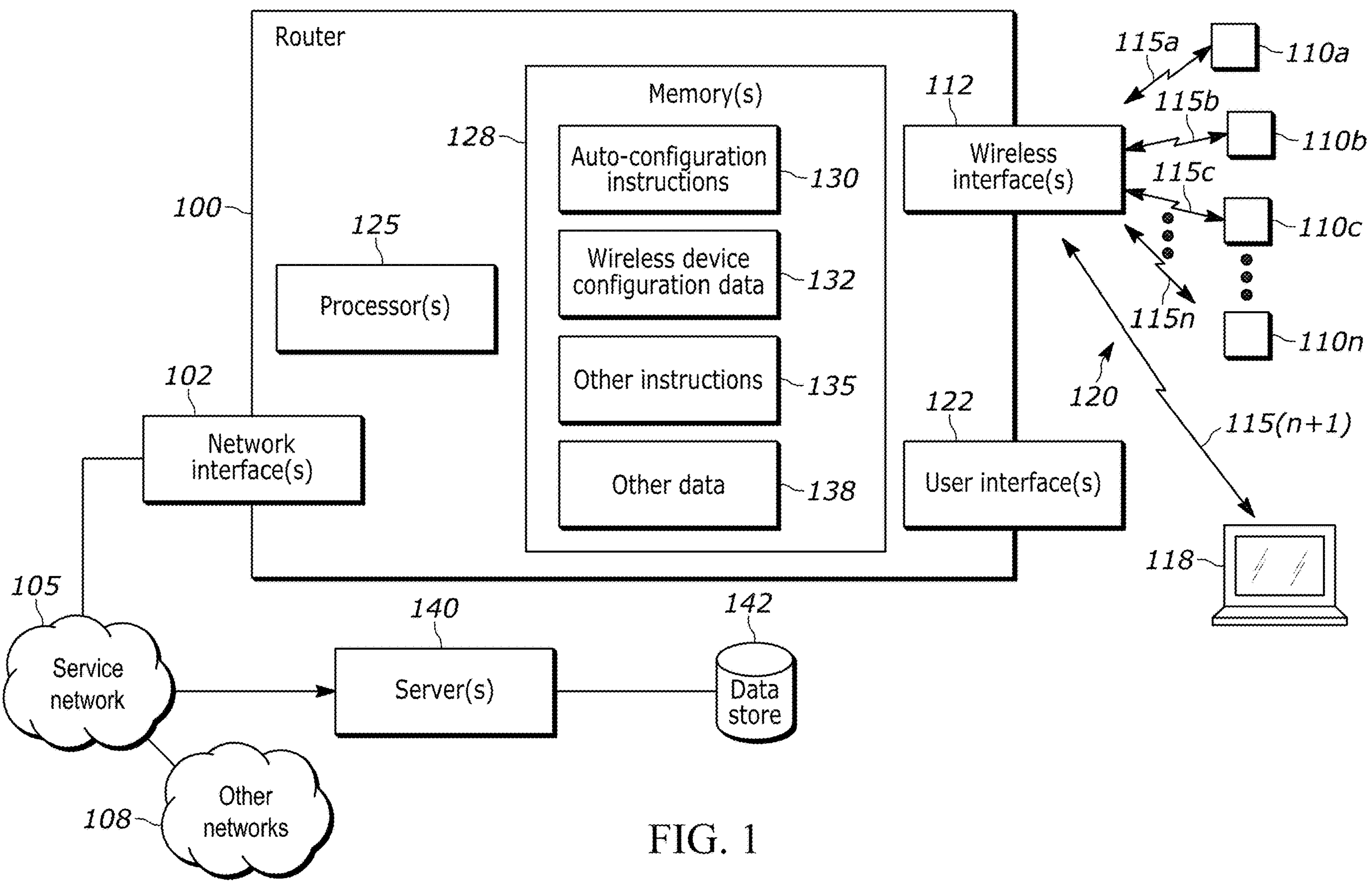

There are shown in the drawings arrangements which are presently discussed, it being understood, however, that the present embodiments are not limited to the precise arrangements and instrumentalities shown.

FIG. 1 is a block diagram of an example router in which the systems, methods, and/or techniques of the present disclosure may be implemented.

Figure 2:
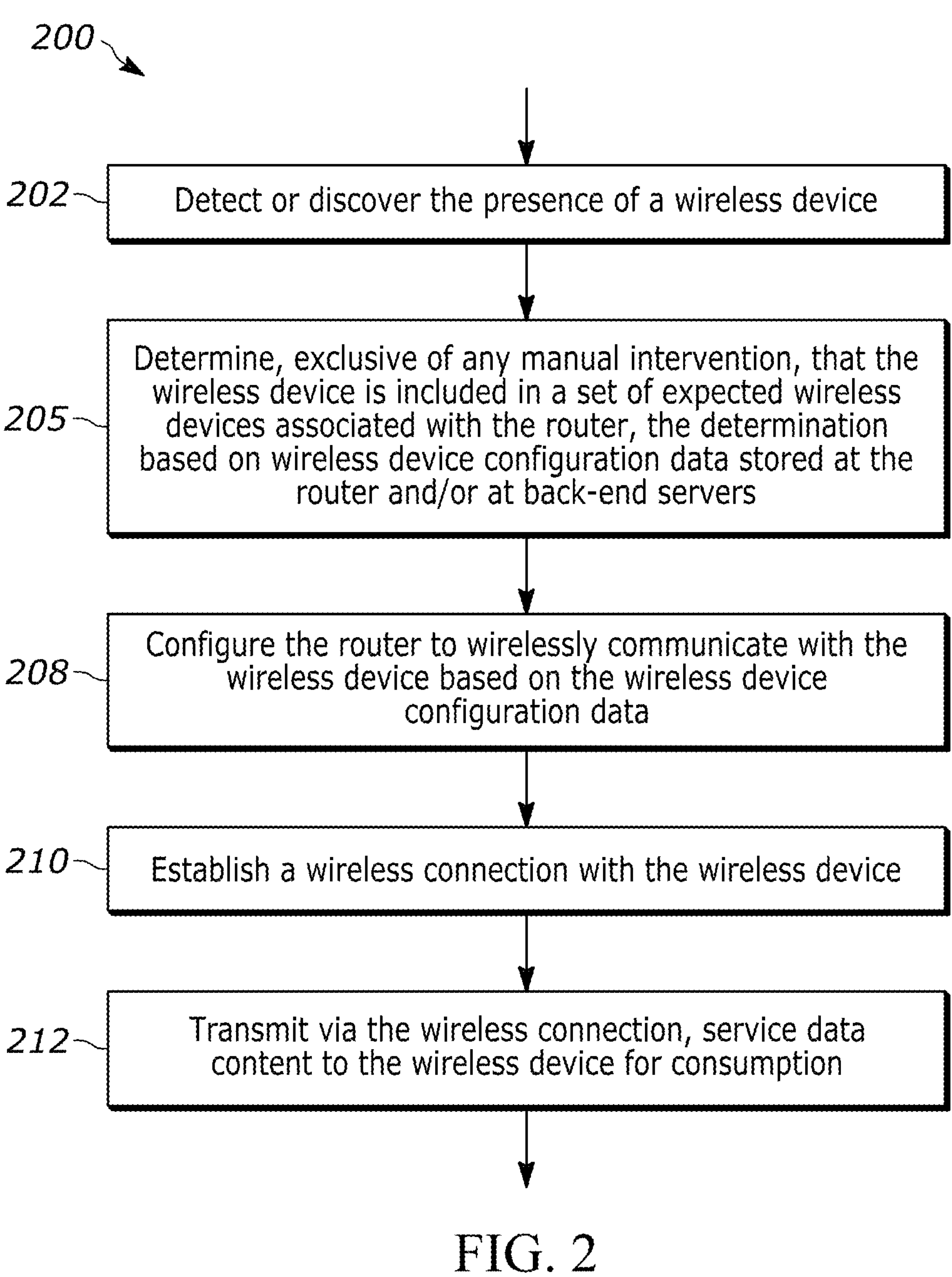

FIG. 2 depicts a flow diagram of an example method at a router, such as the router of FIG. 1.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of the present disclosure.

The apparatus and method components have been represented where appropriate by conventional symbols in the drawings, showing only those specific details that are pertinent to understanding examples of the present disclosure so as not to obscure the disclosure with details that will be readily apparent to those of ordinary skill in the art having the benefit of the description herein.

Although the figures show parts with clean lines and boundaries, some or all of these lines and/or boundaries may be idealized. In reality, the boundaries and/or lines may be unobservable, blended, and/or irregular. Use of terms such as up, down, top, bottom, side, end, front, back, etc. herein are used with reference to a currently considered or illustrated orientation. If they are considered with respect to another orientation, it should be understood that such terms must be correspondingly modified.

DETAILED DESCRIPTION

The present techniques provide a method and apparatus for enhancing the connectivity and configuration process of wireless devices with routers, focusing on a seamless and user-independent approach. This approach addresses the technical problem of manual pairing requirements that have traditionally hindered the efficient, accurate, and secure setup and expansion of wireless networks, particularly in environments with multiple customer premises equipment (CPEs) such as multiple Internet-of-Things (IoT) devices, wireless network extenders, mobile computing devices, consumer electronics, and household appliances, to name a few. The disclosed methods, apparatuses, and techniques leverage the detection, by a router, of wireless devices and/or wireless CPEs, followed by an automated configuration process that establishes a wireless connection with a detected wireless device without the need for manual user input or in-line pairing. The disclosed methods, apparatuses, and techniques are facilitated by the router's ability to be provisioned with and store configuration data, where the configuration data, includes information indicative of a set of expected wireless devices for the specific router, thereby enabling the router to automatically recognize and configure communication with detected devices that match the expected set. Further, the disclosed methods, apparatuses, and techniques may be similarly utilized in and by intermediate network extenders which themselves have an established wireless connection with a router.

As used herein, the term "router" generally and categorically refers to a device which is disposed at customer premises serviced by a data and/or communications services network, which may be a passive optical network (PON), a cellular network, a copper or digital subscriber line network, a cable network, etc. As such, a "router," as used herein, may refer to a router, a modem, a gateway (e.g., a residential or office gateway), a switch, a wireless access point, etc. Generally speaking, the router may have a network interface to communicatively connect to the external (e.g., with respect to the customer premises) service network, as well as one or more wireless interfaces via which the router may establish one or more wireless connections with other wireless devices at the serviced location via one or more wireless local area network(s) (WLANs), such as Wi-Fi or other short-range wireless technology networks. Additionally, the terms "service location," "customer premises," "customer service location," "end-user premises," and "end-user service location" are interchangeably utilized herein to generally refer to a last-mile location to which a data and/or communications network provides data and/or communications services. Examples of service locations may include a home, an apartment, a condominium, an office, a business location, a school, or some other type of last-mile location.

Example Router

FIG. 1 is a block diagram representative of an example router 100 which may be disposed at a location serviced by a data and/or communications services network. As depicted in FIG. 1, the example router 100 may include one or more external-facing network interfaces 102 communicatively connecting the router 100 to a communication and/or data network 105 via which a service provider provides data and/or communications services to multiple customer premises or service locations, including the location being serviced by the router 100. The service network 105 may include a copper network, a digital network, an optical network, a wireless communications network, a hybrid transport communications and/or data network, and/or any other type of digital network via which data and services may be delivered to last-mile locations serviced by the service network 105. As such, the service network 105 is interchangeably referred to herein as an "external" service network 105 as the network 105 is external to any last-mile customer premises. Typically, the service network 105 may be communicatively connected to one or more other data and/or communications networks 108, which may include one or more wired and/or wireless networks, one or more private and/or public networks (such as the Internet), etc. The other networks 108 may communicatively connect the service network 105 to one or more third-party servers (not shown) at which various end-user services may be provided (e.g., hosted), where such services may be consumed at the last-mile locations being serviced by the service network 105.

During operations, the router 100 may receive, via external network interface(s) 102, service content which has been delivered over the service network 105 (and optionally over the other networks 108) to the router 100 for eventual consumption at various customer premises equipments 110*a*-110*n* (CPEs) disposed at the customer premises serviced by the router 100. The CPEs 110*a*-110*n* may be wireless devices, and may include devices such as wireless network extenders, wireless access points, Internet-of-Things (IOT) devices, mobile computing devices (such as laptops, tablets, smart devices, cell phones, etc.), consumer electronics devices, household appliances, and/or other types of wireless devices. Typically, but not necessarily, the CPEs 110 may include respective user interfaces such as lights other types of indicators, screens, speakers, displays, and the like. The service content received at the router 100 may include payload of various data and/or communications services, signaling for the services, metadata for the payload and signals of the services, etc. Examples of such services may include, for example, streaming services, on-demand services, television services, Internet services, mobile applications, IoT services, and/or telephony services, to name a few.

As such, the router 100 may route or switch various portions (or all) of the received service content to respective one or more CPEs 110*a*-110*n* via one or more wireless interfaces 112 of the router 100 and respective wireless connections 115*a*-115*n*, so that the desired service content may be consumed at the intended recipient CPEs 110*a*-110*n* disposed at the customer premises. The wireless interfaces 112 may support any one or more short-range wireless technologies, such as Bluetooth, Wi-Fi, ZigBee, ultra-wideband (UWB), Radio Frequency Identification (RFID), Near Field Communication (NFC), infrared (IR), SparkLink, and/or other short-range wireless technologies. In some situations, in addition to wireless connecting to CPEs 110*a*-110*n* associated with the customer, the router 100 may wirelessly connect, via wireless interfaces 112 and a respective wireless connection 115(*n*+1), with a portable computing device 118 which is being utilized by an agent of the service provider, e.g., for diagnostic, debugging, performance measurement, configuration, and/or other such activities related to providing data and/or communications services at the customer premises. In effect, the router 100 may host or support a local wireless area network 120, of which the router 100, the CPEs 110*a*-110*n*, and optionally the agent computing device 118 are nodes and in which the wireless connections 115*a*-115(*n*+1) are included (e.g., as wireless links).

The router 100 may include one or more physical user interfaces 122 via which an end-user, customer, or agent of the service provider may directly interact with the router 100 on premises. Such user interfaces 122 may include buttons, switches, lights or other indicators, displays, touchscreens, keyboards, navigation devices, microphones, speakers, I/O interfaces to which I/O devices may be connected, and the like.

As further shown in FIG. 1, the router 100 may include one or more processors 125 and one or more tangible, non-transitory memories 128 storing a set of computer-executable instructions 130 that are executable by the one or more processors 125 to cause the router 100 to automatically configure wireless connections for wireless devices detected by the router 100 at the customer premises, where the automatic configuring may be based on wireless device configuration data 132 stored in the memories 128. As such, the computer-executable instructions 130 are referred to interchangeably herein as "auto-configuration instructions" 130. The wireless device configuration data 132 may have been pre-populated into the memories 128, such as during provisioning of the router 100 during the initialization, start-up, and/or re-booting of the router 100, in an embodiment. Of course, the processors 125 may execute other machine-readable instructions 135 stored on the memories 128, and the example processors 125 may also interact with the memories 128 to read and/or store other data 138 such as data formed or used during execution of the machine-readable instructions 130 and/or the other machine-readable instructions 135. Generally speaking, the machine-readable instructions 130, when executed by the processors 125, may cause the router 100 to perform at least some of the operations represented by embodiments of the methods described in this disclosure.

The one or more processors 125 may be implemented using hardware, and may include a semiconductor based (e.g., silicon-based) or other suitable type of device. The one or more processors 125 may include, for example, one or more programmable microprocessors, controllers, digital signal processors (DSP), graphics processing units (GPU) and/or any suitable type of programmable processor capable of executing instructions to, for example, implement operations of the example methods described herein. Additionally and/or alternatively, the one or more processors 125 may include a field programmable gate array (FPGA), an application specific integrated circuit (ASIC), etc. that implements operations of the example methods described herein without executing instructions The one or more memories 128 are accessible by the one or more processors 125 (e.g., via a memory controller). Example memories 128 include any number and/or type(s) of volatile or non-volatile, non-transitory, machine-readable storage medium, devices or disks, such as a semiconductor memory, magnetically readable memory, optically readable memory, biologically readable memory, a hard disk drive (HDD), a solid-state drive (SSD), a read-only memory (ROM), a random-access memory (RAM), a redundant array of independent disks (RAID) system, a cache, flash memory, or any other storage medium, device or disk in which information may be stored for any duration (e.g., permanently, for an extended time period, for a brief instance, for temporarily buffering, for caching of the information, etc.). Additionally and/or alternatively, machine-readable instructions 130, 128 corresponding to the example operations described herein may be stored on one or more volatile or non-volatile, non-transitory, machine-readable removable storage media (e.g., a compact disc (CD), digital versatile disk (DVD), Blu-ray disk, removable flash memory, etc.) that may be coupled to the router 100 to provide access to the machine-readable instructions stored thereon.

Via its external network interface(s) 102 and the external service network 105, the router 100 may be communicatively connected to one or more servers 140 (e.g., one or more back-end servers 140) of the service network 105. For example, some of the services which are provided to customer premises may be provided by or hosted at the one or more servers 140 (e.g., user account management, help pages, equipment ordering, etc.). Additionally, the one or more servers 140 may host or provide one or more services to provide management, administrative, test, and/or diagnostic functionalities of the network 105. Notably, the one or more back-end servers 140 may include a configuration server (not explicitly shown) which provisions, pre-populates, or configures the router 100 with at least a portion of the wireless device configuration data 132, as is described in more detail elsewhere herein. The wireless device configuration data 132 of the router 100 and of other routers associated with the service network 105 (not shown), as well as other data and information utilized by the one or more servers 140 to manage the service network 105 and customers serviced by the service network 105 may be stored in a back-end data store 142 which is accessible to the one or more servers 140. The wireless device configuration data 132 may have been populated and/or stored into the back-end data store 142 by an application executing at the servers 140, by a user via a user interface of the servers 140, based on information or files provided by other third-party servers (e.g., via networks 108 and 105 and servers 140), etc.

Example Method at a Router

FIG. 2 depicts a flow diagram of an example method 200 at a router, such as the router of FIG. 1. For example, instances of the method 200 may be executed at the router 100. In an example implementation, the auto-configuration instructions 130 stored on the one or more memories 128 may be executable by the one or more processors 125 of the router 100 to cause the router 100 to perform at least a portion of embodiments of the method 200. For ease of illustration, and not for limitation purposes, the method 200 is described with simultaneous reference to the router 100 of FIG. 1. Further, in embodiments, the method 200 may include additional and/or alternate steps or actions, if desire At a block 202, the method 200 may include detecting or discovering, by the router, a presence of a wireless device, e.g., the wireless device 110*a*. The wireless device 110*a* may be a customer premises equipment, such as previously discussed. For example, the wireless device 110*a* may be a wireless network extender, an Internet-of-Things (IOT)

device, a mobile computing device, a consumer electronics device, a household appliance, or another type of wireless device disposed at a location at which the router is disposed. For example, the router 100 may detect 202 the presence of the wireless device 110*a* at the customer premises service by the service network 105 via the router 100.

In some embodiments, the router may detect or discover 202 the presence of the wireless device 110*a* upon the wireless device 110*a* being plugged in, booted up, and/or restarted. For example, the wireless device 110*a* may, upon being plugged in, booted up, or restarted, generate and transmit (e.g., via a beacon or broadcast channel of the specific wireless technology being utilized by the wireless device 110*a*) a wireless signal which may be detected by the router 100. As such, in these embodiments, the router 100 may detect or discover 202 the presence of the wireless device 110*a* by monitoring one or more wireless beacon or broadcast channels to detect a transmission generated by the wireless device 110*a* and those generated by other wireless devices 110*a*-110*n* which are proximately located and activated. The transmission generated by the wireless device 110*a* may include identifying device information of the wireless device 110*a*, for example. In some situations, the wireless device 110*a* may generate multiple wireless signals via different short-range wireless technologies, and the router 100 may detect 202 each of the multiple wireless signals in which identifying device information of the wireless device 110*a* is included.

In some embodiments, the router 100 may detect 202 the presence of the wireless device 110*a* by using other types of sensing technologies, such as by using optical and/or infrared (IR) sensing of the presence of the wireless device 110*a*. For example, via an optical sensor and/or an IR sensor, the router 100 may sense or detect a digital code such as a bar code or QR code which is physically disposed on the wireless device 110*a*, where the digital code may encode or include identifying device information of the wireless device 110*a*. In such embodiments, the router 100 may include the optical and/or the IR sensor and decoders to decode the information indicative of the wireless device 110*a* which is embedded in the digital code disposed at the wireless device 110*a*.

Thus, and generally speaking, the router 100 may detect or discover 202 the presence of the wireless device 110*a* by using any one or more wireless technologies, such as Bluetooth, Wi-Fi, ZigBee, Z-Wave, Thread, ultra-wideband (UWB), Radio Frequency Identification (RFID), Near Field Communication (NFC), infrared (IR), SparkLink, optical sensing, IR sensing, and/or other suitable short-range wireless technologies.

The wireless device 110*a* may provide one or more types of identifying information in the transmitted wireless signal and/or in the digital code disposed at the wireless device 110*a*. Examples of such identifying information may include, for example, a serial number of the wireless device 110*a*; a media access control (MAC) address of the wireless device 110*a*; an Internet Protocol (IP) address of the wireless device 110*a*; a node identifier (ID); a tag; an identification code; a key (such as a pre-shared key), a certificate, other types of authenticating, authorizing, and/or access control information related to the wireless device 110*a*; a Service Set Identifier (SSID) or other type of network ID or address (which may be different than the network ID or address of the local wireless network 120 supported by the router at the customer premises); and/or the like. In some embodiments, a single type of identifying information of the wireless device 110*a* is included in the transmitted wireless signal and/or the digital code disposed at the wireless device 110*a*. In some embodiments, multiple different types of identifying information of the wireless device 110*a* are provided by the wireless device 110*a* in the transmitted wireless signal and/or the digital code disposed at the wireless device 110*a* (e.g., SSID and MAC address, serial number and SSID, etc.).

At a block 205, the method 200 may include, exclusive of any in-line user input corresponding to the detecting 202 of the presence of the wireless device 110*a*, determining that the detected wireless device 110*a* is included in a set of expected wireless devices corresponding to or associated with the router 100, e.g., in a set of wireless devices which have designated as being allowed or permitted, a priori, to communicate with the router 100. The determining 205 may be based on information that is indicative of the set of expected wireless devices corresponding to the router 100 and that is obtained by the router 100 from one or more back-end servers 140. For example, information that is indicative of the set of expected wireless devices corresponding to the router 100 may be stored in the data store 142. Such information may be obtained from the data store 142 via the servers 140 and/or locally stored at the router 100, for example, in wireless device configuration data 132. Notably, the determining 205 is performed exclusive of any in-line user input, that is, without utilizing or requiring any user input to be entered in-line with the detecting 202. That is, the determining 205 is automatically performed by the auto-configuration instructions 130 without utilizing any manual pairing and/or set-up of the router 100 and/or of the detected wireless device 110*a* (e.g., without utilizing an application and/or a website and/or without physically manipulating the router 100), and without any manual pairing and/or set-up of the local area network 120 of which the router 100 is a node and the detected wireless device 110*a* (e.g., without utilizing an application and/or a website and/or without physically manipulating the router 100). Indeed, the block 205, other blocks of the method 200, and/or the entirety of the method 200, for that matter, may be performed without utilizing or requiring any manual intervention at all.

As previously mentioned, the wireless device configuration data 132 may be obtained by the router 100 from the data store 142 and via one or more back-end servers 140 of the service network 105, e.g., from a configuration server included in the back-end servers 140. In some embodiments, the router 100 may obtain the wireless device configuration data 132 from the servers 140 upon detecting 202 of the presence of the wireless device 110*a* (e.g., by sending a request to the servers 140 upon detecting 202 the presence of the wireless device 110*a*). Upon responsively obtaining the wireless device configuration data 132 from the servers 140, the router 100 may store the obtained wireless device configuration data 132 into its memories 128.

In some embodiments, the wireless device configuration data 132 may be provisioned or otherwise pre-populated into the router 100 (e.g., into the memories 128 of the router 100 as wireless device configuration data 132) prior to the detecting 202 of the presence of the wireless device 110*a*. The provisioning of the router 100 may be performed by and/or in conjunction with the servers 140 over the service network 105, e.g., automatically or without any manually intervention or instruction. For example, upon initialization, boot-up, or re-start of the router 100, the servers 140 may provision the router 100 with various configuration data and other types of data necessary for router operations. Such provisioned data may include the wireless device configuration data 132, as well as other types of data such as data for the router 100 to connect to the service network 105, to perform diagnostics and/or self-tests, to implement software and/or firmware updates, and to otherwise perform operations. The provisioned data may be stored locally at the router 100 in wireless device configuration data 132 and in other data 138, for example.

Generally speaking, the wireless device configuration data 132 may be indicative of a set of wireless devices which are designated (e.g., a priori) as being expected, permitted, or allowed to connect with the router 100 and/or to connect to the local wireless network 120 at the customer premises. For example, to provide services via the network 105 at a customer premises, a service provider may provide the customer with a router 100 as well as one or more network extenders 110 which, as a package, is to provide desired wireless coverage throughout the customer premises. As such, the back-end servers 140 of the network 140 may store, in the data store 142, as indications of the permitted associations of the provided router 100 and network extenders 110 as well as identifications and configuration data for the router 100 and for the network extenders 110 needed for the router 100 and the network extenders 110 to communicate with each other. Such identifications and configuration data may include, for example, serial numbers, MAC addresses, IP addresses, node IDs, identification codes, and/or tags of the router and/or of at least some of the network extenders; access control information such as keys (e.g., pre-shared keys), certificates, and/or other types of access control or security information which may be utilized for authenticating and/or authorizing network extenders to connect to the local area network 120 and to the router 100; Service Set Identifiers (SSIDs) or other type of network IDs or addresses of the router and/or of at least some of the network extenders (which may be different SSIDs, in some situations), and/or the like. In some embodiments, multiple different types of identifying information and configuration data of the router and each network extender are included in the wireless device configuration 132. In some embodiments, different types of identifying information are provided in the wireless device configuration data 132 for different network extenders. The wireless device configuration data 132 may include information needed for wirelessly connecting the network extenders and the router by using one or more types of wireless technologies and/or wireless protocols, such as Bluetooth, Wi-Fi, ZigBee, UWB, RFID, NFC, IR, SparkLink, IoT, TR-369 or User Service Platform (UP), etc. Of course, while the above examples of types of wireless device configuration data 132 are discussed in relation to network extenders, it is understood that the same and/or similar type of wireless device configuration data 132 may be similarly applicable for other types of wireless devices (e.g., IoT devices, mobile computing devices, consumer electronics devices, household appliances, or other types of wireless device provided by the service provider or by a third-party) which are designated (e.g., a priori) as being expected, permitted, and/or allowed to wirelessly connect with the router 100.

Generally speaking, the determining 205 that the wireless device 110*a* is included in the set of expected wireless devices corresponding to the router may be based on a comparison of the wireless device configuration data 132 stored at the router 100 and the identification and/or configuration information of the wireless device 110*a* that is stored at the wireless device 110*a*. The wireless device 110*a* may have been pre-populated or provisioned (e.g., at the factory or at a staging area) with information that identifies the wireless device and optionally configuration information for the wireless device 110*a* such as keys and/or other access control information, a Service Set Identifier (SSID) or other type of network ID or address, a MAC address, etc., and such identification and configuration information stored at the wireless device 110*a* may be compared with the wireless device configuration data 132 of the router 100 to determine whether or not the wireless device 110*a* is an expected wireless device for the router 100. It is noted that the SSID and/or other types of network IDs or addresses stored at the wireless device 110*a* may not be the same as those that are to be utilized for the wireless communications between the router 100 and the wireless device 110*a*. Rather, such SSID and/or other types of network IDs or addresses which have been pre-populated or stored into the wireless device 110*a* may be utilized for validation purposes (e.g., of the wireless device 110*a* to the router 100), and may be updated at the wireless device 110*a* with operational SSIDs and/or other types of network IDs when establishing the actual wireless connection between the router 100 and the wireless device 110*a*. For example, an SSID which has been pre-populated into the wireless device 110*a* may be an IoT SSID, whereas during wireless communications with the router 100, the wireless device 110*a* may utilize the SSID associated with the router 100 at the service location.

The auto-configuration instructions 130 at the router 100 and/or instructions executed by the wireless device 110*a* (not shown) may perform the comparison between the pre-populated or stored information at the wireless device 110 and the wireless device configuration data 132. In some embodiments, a single type of identifying information of the wireless device 110*a* is compared with the contents of the wireless device configuration data 132 (e.g., serial number only, MAC address only, etc.). In some embodiments, multiple different types of identifying information of the wireless device 110*a* is compared with the contents of the wireless device configuration data 132 (e.g., SSID and MAC address, serial number and SSID, etc.). Generally, the wireless device 110*a* is determined to be included in the set of expected wireless devices of the router when the wireless device configuration data 132 stored at the router 100 and the information that is indicative of the wireless device 110*a* and stored at the wireless device 110*a* are the same and/or in accordance with each other.

For example, in an embodiment, the wireless device 110*a* may include at least some of its stored identifying and/or configuration information in the wireless signal which the wireless device 110*a* transmits via a beacon or broadcast channel, e.g., upon initialization, boot-up, or re-start of the wireless device 110*a*. Additionally or alternatively, the wireless device 110*a* may include at least some of its stored identifying and/or configuration information in a wireless signal transmitted by the wireless device 110*a* in response to a request from the router 100. The router 100 may compare the identifying and/or configuration information provided by the wireless device 110*a* with the locally stored wireless device configuration data 132 to determine whether the wireless device 110*a* is included in the set of expected wireless devices for the router 100.

In another embodiment, the router 100 may establish an initial wireless connection with the wireless device 110*a* upon detecting 202 the presence of the wireless device 110*a*, e.g., for the purposes of validating the wireless device 110*a*, among other purposes. Via the initial wireless connection, the router 100 may transmit at least some of the wireless device configuration data 132 to the wireless device 110*a*, and the wireless device 110*a* may compare the wireless device configuration data 132 received from the router 100 with its locally stored identifying and configuration information. When the compared data/information is in accordance, the wireless device 110*a* may transmit, to the router 100, an indication of a validation of the wireless device 110*a* being included in the set of expected wireless devices for the router 100. The validation may be transmitted via the initial wireless connection between the router 100 and the wireless device 110*a*, or via another wireless connection, such as a wireless connection which is established after the initial wireless connection which can be used for data delivery of service content, for example. In this embodiment, the router 100 may determine 205 that the wireless device 110*a* is an expected wireless device 110*a* for the router 100 upon receiving the validation from the wireless device 110*a.*

Of course, other embodiments of the block 205 are possible and may be utilized in the method 200.

At a block 208, the method 200 may include configuring the router 100 to communicate with the detected wireless device 110*a* based on the determining 205 that the detected wireless device 110*a* is included in the set of expected wireless devices for the router 100. For example, responsive to determining 205 that the detected wireless device is included in the set of expected wireless devices for the router 100, the router 100 may configure itself to wirelessly connect with the wireless device 110*a* by using respective portions of the wireless device configuration data 132. Similar to the block 205, the block 208 may be performed exclusive of any in-line user input.

At a block 210, the method 200 may include establishing a wireless connection with the wireless device 110*a* based on the configuring 208. For example, responsive to the configuring 208 of the router 100 to wirelessly connect with the detected wireless device 110*a*, the router 100 may establish a wireless connection with the detected wireless device 110*a* over the local wireless network 120 to use for the delivery of service content and signaling to and from the wireless device 110*a*. Similar to the block 205, the block 210 may be performed exclusive of any in-line user input. In some implementations, the establishing 210 of the wireless connection with the wireless device 110*a* may include authenticating and/or authorizing the detected wireless device 110*a* to the router 100 and/or to the local wireless network 120. Typically, the authenticating and/or authorizing of the detected wireless device 110*a* may utilize at least some of the wireless device configuration data 132 corresponding to the wireless device 110*a*, such as shared keys, certificates, and/or other types of access control information.

At a block 212, the method 200 may include transmitting, to the wireless device 110*a* and via the established wireless connection, service content data to be consumed at the wireless device 110*a*. The service content data may include, for example, the payload of a service provided by the servers 140 or by a third-party server, signaling for the service, metadata for the payload and signaling of the service, etc. The service content data may have been received by the router 100 via the service network 105 and the external network interface(s) 102, for example. The established wireless connection may also be utilized to deliver service content data generated or otherwise provided by the wireless device 110*a* to the router 100.

In an embodiment (not shown in FIG. 2), the detected wireless device 110*a* may be a detected first wireless device, and the method 200 may further include detecting, by the router, a presence of a second wireless device, e.g., wireless device 110*b*. Upon detecting the presence of the second wireless device 110*b*, the router 100 may attempt to determine (again exclusive of any in-line user input corresponding to the detecting of the presence of the second wireless device 110*b*), whether the second wireless device 110*b* is included in the set of expected wireless devices for the router 100, e.g., in a manner similar to the block 205 discussed above. Additionally or alternatively, the router 100 may attempt to configure the router 100 (again exclusive of any in-line user input) to communicate with the detected second wireless device 110*b*, e.g., in a manner similar to the block 208 discussed above. Still additionally or alternatively, the router 100 may attempt to establish (again exclusive of any in-line user input), a wireless connection with the second wireless device 110*b*, e.g., in manner similar to the block 210 discussed above. In this embodiment, if any of the attempts discussed above with regard to the second wireless device 110*b* fails or is otherwise not successful, the method 200 may include initiating a manual pairing or set-up procedure for the router 100 and/or for the second wireless device 110*b*, e.g., via an application, a website, or some other suitable means.

One of ordinary skill in the art will appreciate that techniques such as discussed above in the method 200 for the router 100 may be easily applied to wireless devices which are currently connected to the router 100 via the local area network 120 so that, currently connected wireless devices may automatically discover and configure additional wireless devices for communication with the router 100. In an example scenario, wireless device 110*c* of FIG. 1 is wirelessly connected to the router 100 via established wireless connection 115*c* of the local network 120. For example, an instance of the method 200 may have been executed so that wireless device 115*c* is wirelessly connected to the router 100. As such, wireless device 110*c* is referred to herein as a "connected" wireless device. Wireless device 110*c* may be, for example, a network extender or other type of wireless device.

The connected wireless device 110*c* may execute or perform at least portions of the method 200 may be performed by the connected wireless device 110*c* with respect to another wireless device (e.g., wireless device 110*n*), e.g., in manners similar to that discussed above. In an example implementation, a set of computer-executable instructions stored on one or more memories of the connected wireless device 110*c* may be executable by one or more processors of the connected wireless device 110*c* to cause the connected wireless device 110*c* to perform at least a portion of embodiments of the method 200.

For example, the wireless device 110*c* may detect 202 the presence of wireless 110*n*, determine 205 whether or not detected wireless device 110*n* is included in the set of expected wireless devices for the router 100 based on communicating with the router 100 with regard to the wireless device configuration data 132 stored at the router 100. However, when the connected wireless device 110*c* needs access to wireless device configuration data 132 in order to perform the determination 205, the connected wireless device 110*c* may communicate with the router 100 via established wireless connection 115*c* over local area network 120 to obtain the wireless device configuration data 132. Router 100 may access its local wireless device configuration data 132 (e.g., which may have been previously provisioned into its local memory 128) and/or request the servers 140 to provide wireless device configuration data 132 responsive to the request of the connected wireless device 110*c*, for example.

When the detected wireless device 110*n* is determined by the wireless device 110*c* to be included in the set of expected wireless devices of the router 100, the wireless device 110*c* may configure 208 itself to wirelessly connect with the detected wireless device 110*n*, e.g., via a direct wireless link (again, by utilizing the wireless device configuration data 132). Subsequently, service data content may be delivered between the router 100 and the wireless device 110*n* via the intermediate wireless device 110*a*, for example. Thus, wireless devices 110 may be automatically discovered and auto-configured by not only by the router 100 but also by any wireless devices 110 which have established wireless connections with the router 100. In this manner, multiple wireless devices 110 located at the service location may be automatically chained together to provide wireless services and coverage throughout the service location.

One significant improvement introduced by the present techniques is the enhancement of processing efficiency within the router. By automating the detection and configuration process, the router minimizes the computational overhead associated with manual setup procedures, thereby optimizing its processing capabilities for other critical tasks. This automation is achieved through the router's ability to detect wireless signals from devices, determine the device's inclusion in a pre-defined or pre-designated set of expected devices based on information obtained from back-end servers, and subsequently configure itself to establish a wireless connection with the device. This streamlined process reduces the time and processing power required to integrate new devices into the network.

Another improvement is the optimization of network usage. The present techniques enable routers to efficiently manage network resources by automatically identifying and authenticating devices that are authorized to join the network. This capability is particularly beneficial in environments with a high density of wireless devices, as it ensures that only expected and authorized devices are connected, thereby preventing unauthorized access and optimizing network bandwidth usage. The router's ability to obtain information from back-end servers, including authentication keys and certificates, further enhances network security and integrity.

Furthermore, the present techniques contribute to improved memory usage within the router. By prepopulating the router with information about expected wireless devices, the router can quickly reference this data during the detection and configuration process, thereby reducing the need for extensive memory operations associated with dynamic data retrieval and analysis. This prepopulated information includes details such as serial numbers, MAC addresses, pre-shared keys, and SSIDs, which are essential for the identification and authentication of devices. The efficient management of this information within the router's memory facilitates a rapid and streamlined configuration process, enhancing the overall performance and responsiveness of the router.

In summary, the present techniques offer a comprehensive solution to the challenges associated with manual device pairing and network configuration. By automating the detection, identification, and configuration processes, the techniques significantly improve processing efficiency, optimize network usage, and enhance memory management within routers. These improvements are achieved through the strategic use of prepopulated data, automated authentication and authorization mechanisms, and efficient information management, thereby addressing the technical problem of manual setup inefficiencies and providing a seamless, user-independent approach to wireless network expansion.

Additional Considerations

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific examples have been described. However, one of ordinary skill in the art appreciates that various modifications and changes can be made without departing from the scope of the disclosure as set forth in the claims below. Accordingly, the specification and figures are to be regarded in an illustrative rather than a restrictive sense, and all such modifications are intended to be included within the scope of the disclosure. Additionally, the described examples should not be interpreted as mutually exclusive, and should instead be understood as potentially combinable if such combinations are permissive in any way. In other words, any feature disclosed in any of the aforementioned examples may be included in any of the other aforementioned examples.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting example the term is defined to be within 10%, in another example within 5%, in another example within 1% and in another example within 0.5%. The term "coupled" as used herein is defined as connected, although not necessarily directly and not necessarily mechanically. A device or structure that is "configured" in a certain way is configured in at least that way, but may also be configured in ways that are not listed.

Further, unless expressly stated to the contrary, "or" refers to an inclusive or and not to an exclusive or. For example, "A, B or C" refers to any combination or subset of A, B, C such as (1) A alone, (2) B alone, (3) C alone, (4) A with B, (5) A with C, (6) B with C, and (7) A with B and with C. As used herein, the phrase "at least one of A and B" is intended to refer to any combination or subset of A and B such as (1) at least one A, (2) at least one B, and (3) at least one A and at least one B. Similarly, the phrase "at least one of A or B" is intended to refer to any combination or subset of A and B such as (1) at least one A, (2) at least one B, and (3) at least one A and at least one B.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, inventive subject matter may lie in less than all features of a single disclosed example. Thus, the following claims are hereby incorporated into the Detailed Description, with each claim standing on its own as a separately claimed subject matter.

Further, as used herein, the expressions "in communication," "coupled" and "connected," including variations thereof, encompasses direct communication and/or indirect communication through one or more intermediary components, and does not require direct mechanical or physical (e.g., wired) communication and/or constant communication, but rather additionally includes selective communication at periodic intervals, scheduled intervals, aperiodic intervals, and/or one-time events. The examples are not limited in this context.

Further still, unless expressly stated to the contrary, "or" refers to an inclusive or and not to an exclusive or. For example, "A, B or C" refers to any combination or subset of A, B, C such as (1) A alone, (2) B alone, (3) C alone, (4) A with B, (5) A with C, (6) B with C, and (7) A with B and with C. As used herein, the phrase "at least one of A and B" is intended to refer to any combination or subset of A and B such as (1) at least one A, (2) at least one B, and (3) at least one A and at least one B. Similarly, the phrase "at least one of A or B" is intended to refer to any combination or subset of A and B such as (1) at least one A, (2) at least one B, and (3) at least one A and at least one B.

Moreover, in the foregoing specification and the attached drawings, specific examples have been described. However, one of ordinary skill in the art appreciates that various modifications and changes can be made in view of aspects of this disclosure without departing from the scope of the disclosure as set forth in the claims below. Accordingly, the specification and figures are to be regarded in an illustrative rather than a restrictive sense, and all such modifications made in view of aspects of this disclosure are intended to be included within the scope of present teachings. Numerous alternative examples could be implemented, using either current technology or technology developed after the filing date of this patent, which would still fall within the scope of the claims. By way of example, and not limitation, the disclosure herein contemplates at least the following examples:

Additionally, the benefits, advantages, solutions to problems, and any element(s) that may cause any benefit, advantage, or solution to occur or become more pronounced are not to be construed as a critical, required, or essential features or elements of any or all the claims.

Finally, any references, including, but not limited to, publications, patent applications, and patents cited herein are hereby incorporated in their entirety by reference to the same extent as if each reference were individually and specifically indicated to be incorporated by reference and were set forth in its entirety herein.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method at a wireless device, the method comprising:
- transmitting, by the wireless device and via a beacon or broadcast channel, a signal indicative of a presence of the wireless device, the transmitting of the signal including at least one of:
  - transmitting the signal upon the wireless device booting up or restarting;
  - transmitting the signal via at least one of: Bluetooth, Wi-Fi, ZigBee, Z-Wave, Thread, ultra-wideband (UWB), Radio Frequency Identification (RFID), Near Field Communication (NFC), infrared (IR), SparkLink, or another short-range wireless technology; or
  - transmitting a broadcast signal; and
- exclusive of any in-line user input received by the wireless device:
  - responsive to the transmitting, receiving, by the wireless device and from a router, configuration data for the wireless device, the configuration data included in information indicative of a set of expected wireless devices corresponding to the router, the information stored at one or more back-end servers and obtained, by the router, from the one or more back-end servers;
  - comparing, by the wireless device, the received configuration data with configuration information with which the wireless device has been pre-populated; and
  - when the received configuration data and the pre-populated configuration information are in accordance:
    - transmitting, by the wireless device and to the router, an indication of a validation of the wireless device being included in the set of expected wireless devices of the router; and
    - establishing, by the wireless device and based on the validation, a wireless connection with the router via which service content data is delivered between the router and the wireless device.

2. The method of claim 1, wherein the receiving of the configuration data includes receiving an indication of at least one of: a serial number, a media access control (MAC) address, an Internet Protocol (IP), a node identifier (ID), a tag, an identification code, a key, a certificate, a Service Set Identifier (SSID) or other type of network ID or address, other identification information, or other configuration information.

3. The method of claim 1, wherein the configuration information with which the wireless device has been pre-populated includes at least one of: a serial number, a media access control (MAC) address, an Internet Protocol (IP), a node identifier (ID), a tag, an identification code, a key, a certificate, a Service Set Identifier (SSID) or other type of network ID or address, other information indicative of the wireless device, or other information indicative of a configuration of the wireless device.

4. The method of claim 1, wherein the establishing of the wireless connection with the router includes at least one of authenticating the wireless device or authorizing the wireless device via at least one of a shared key or a certificate.

5. The method of claim 1, wherein the establishing of the wireless connection with the router and exclusive of any in-line user input includes establishing the wireless connection with the router without utilizing any manual pairing of the router and the wireless device.

6. The method of claim 1, wherein the wireless device is a first wireless device, and the method further comprises:
- detecting, by the first wireless device, a presence of a second wireless device; and
- attempting to establish, by the first wireless device and exclusive of any in-line user input corresponding to the detecting of the presence of the second wireless device, a wireless connection with the second wireless device, the attempting to establish including:
  - obtaining, by the first wireless device and from the router, second configuration data for the second wireless device, the second configuration data included in the information indicative of the set of expected wireless devices corresponding to the router; and
  - transmitting, by the first wireless device, the second configuration data to the second wireless device.

7. The method of claim 6, further comprising:
- responsive to the transmitting of the second configuration data, receiving, from the second wireless device, an indication of a validation, by the second wireless device, of the second wireless device being included in the set of expected wireless devices; and
- based on the receiving of the indication of the validation by the second wireless device:
  - configuring the first wireless device to communicate with the second wireless device;
  - establishing, by the first wireless device, the wireless connection with the second wireless device; and
  - transmitting, by the first wireless device, the service content data to the second wireless device via the second wireless connection.

8. The method of claim 6, further comprising upon failing to establish the wireless connection with the second wireless device, initiating a manual pairing procedure between the second wireless device and at least one of the router or the first wireless device.

9. The method of claim 6, wherein the detecting of the presence of the second wireless device includes detecting a presence of a network extender.

10. The method of claim 6, wherein the detecting of the presence of the second wireless device includes detecting a presence of an Internet-of-Things (IOT) device, a mobile computing device, a consumer electronics device, a household appliance, or another type of wireless device having a user interface and disposed at a location at which the router is disposed.

11. A wireless device configured to:

wirelessly transmit, via a beacon or broadcast channel, a signal indicative of a presence of the wireless device, the wireless transmission of the signal being at least one of:

a transmission of the signal upon the wireless device booting up or restarting;

a transmission of the signal via at least one of: Bluetooth, Wi-Fi, ZigBee, Z-Wave, Thread, ultra-wideband (UWB), Radio Frequency Identification (RFID), Near Field Communication (NFC), infrared (IR), SparkLink, or another short-range wireless technology; or a transmission of a broadcast signal; and exclusive of any in-line user input received by the wireless device:

receive, from a router and in response to the wireless transmission, configuration data for the wireless device, the configuration data included in information indicative of a set of expected wireless devices corresponding to the router, the information stored at one or more back-end servers and obtained, by the router, from the one or more back-end servers;

compare the received configuration data with configuration information with which the wireless device has been pre-populated; and when the received configuration data and the pre-populated configuration information are in accordance:

transmit, to the router, an indication of a validation of the wireless device being included in the set of expected wireless devices of the router; and establish, based on the validation, a wireless connection with the router via which service content data is delivered between the router and the wireless device.

12. The wireless device of claim 11, wherein the received configuration data includes an indication of at least one of: a serial number, a media access control (MAC) address, an Internet Protocol (IP), a node identifier (ID), a tag, an identification code, a key, a certificate, a Service Set Identifier (SSID) or other type of network ID or address, other identification information, or other configuration information.

13. The wireless device of claim 11, wherein the configuration information with which the wireless device has been pre-populated includes at least one of: a serial number, a media access control (MAC) address, an Internet Protocol (IP), a node identifier (ID), a tag, an identification code, a key, a certificate, a Service Set Identifier (SSID) or other type of network ID or address, other information identifying the wireless device, or other information indicative of a configuration of the wireless device.

14. The wireless device of claim 11, wherein the establishment of the wireless connection with the router includes at least one of an authentication of the wireless device or an authorization the wireless device via at least one of a shared key or a certificate.

15. The wireless device of claim 11, wherein the establishment of the wireless connection with the router and exclusive of any in-line user input includes an establishment of the wireless connection with the router without any manual pairing of the router and the wireless device.

16. The wireless device of claim 11, wherein the wireless device is a first wireless device, and the first wireless device is further configured to:

detect a presence of a second wireless device; and responsive to the detection, attempt to establish, exclusive of any in-line user input corresponding to the detection, a wireless connection with the second wireless device, the attempt to establish including:

obtaining, from the router, second configuration data for the second wireless device, the second configuration data included in the information indicative of the set of expected wireless devices corresponding to the router; and transmitting the second configuration data to the second wireless device.

17. The wireless device of claim 16, wherein the first wireless device is further configured to:

responsive to the transmission of the second configuration data, receive, from the second wireless device, an indication of a validation, by the second wireless device, of the second wireless device being included in the set of expected wireless devices; and based on the reception of the indication of the validation by the second wireless device:

configure the first wireless device to communicate with the second wireless device;

establish the wireless connection with the second wireless device; and transmit the service content data to the second wireless device via the second wireless connection.

18. The wireless device of claim 16, wherein the first wireless device is further configured to: upon a failure to establish the wireless connection with the second wireless device, initiate a manual pairing procedure between the second wireless device and at least one of the router or the first wireless device.

19. The wireless device of claim 16, wherein the second wireless device is a network extender.

20. The wireless device of claim 16, wherein the second wireless device is an Internet-of-Things (IOT) device, a mobile computing device, a consumer electronics device, a household appliance, or another type of wireless device having a user interface and disposed at a location at which the router is disposed.

* * * * *